March 13, 1934.   C. H. HOWELL ET AL   1,950,848
VALVE
Filed April 17, 1933   3 Sheets-Sheet 1
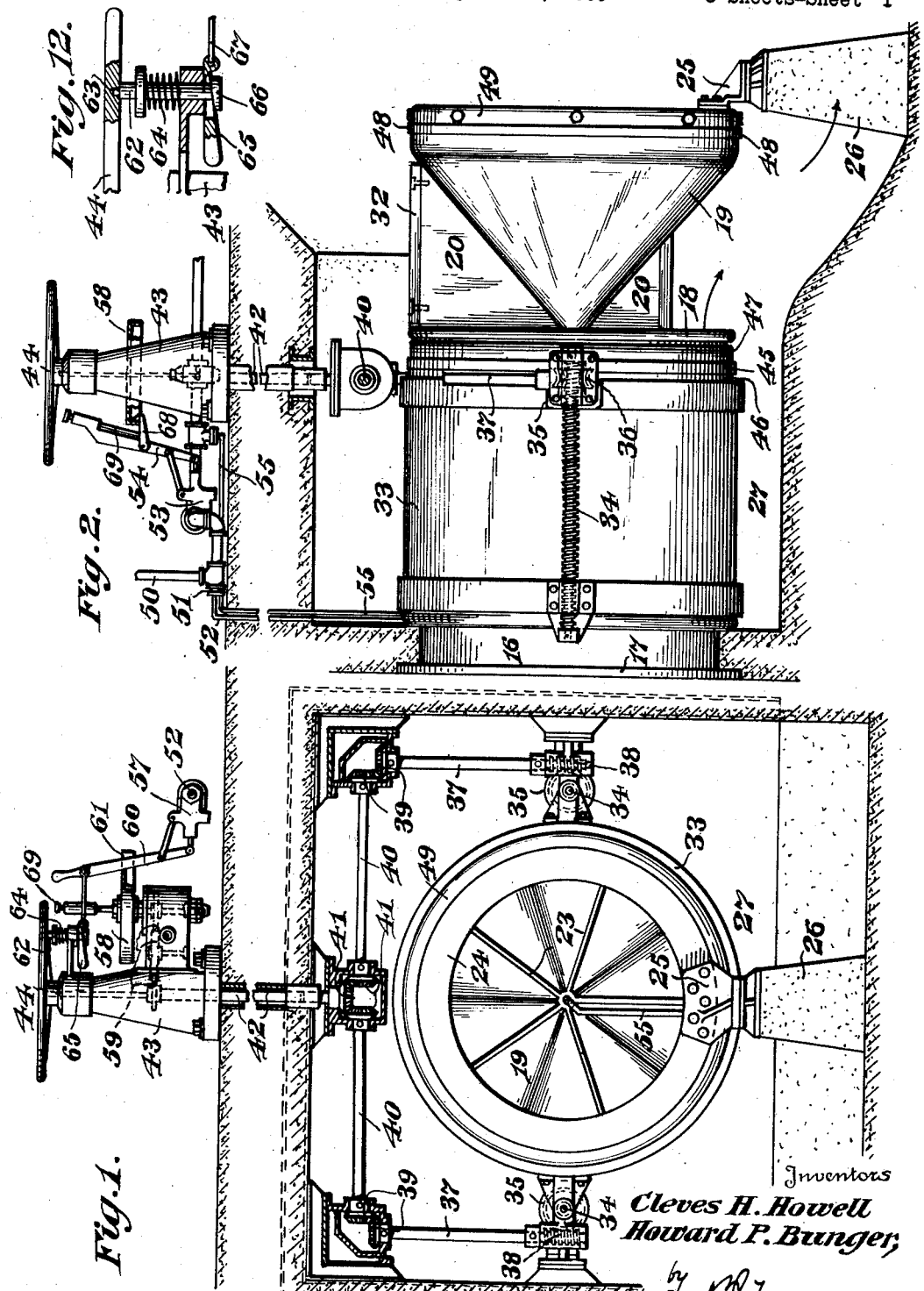

March 13, 1934.　　C. H. HOWELL ET AL　　1,950,848
VALVE
Filed April 17, 1933　　3 Sheets-Sheet 2
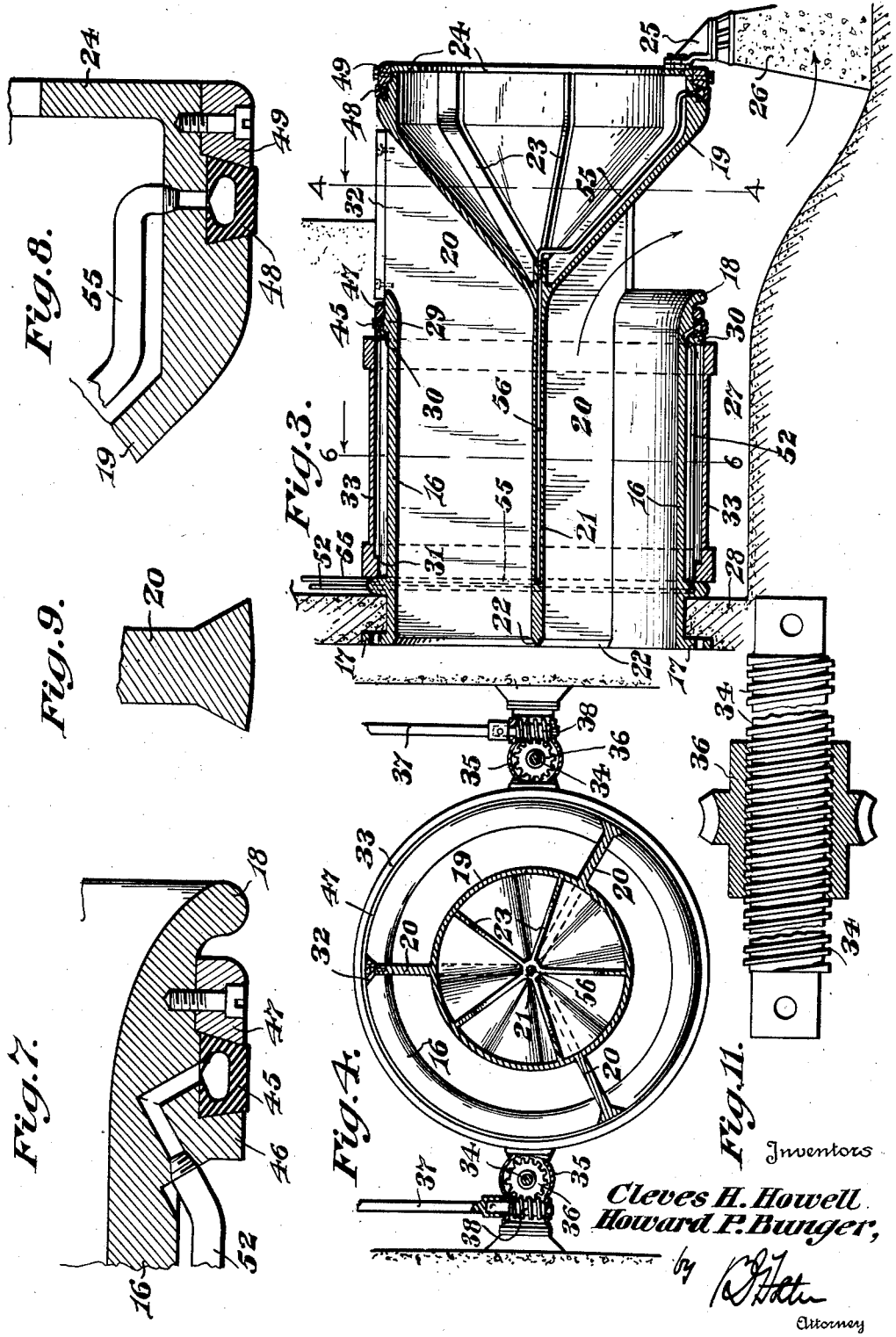
Inventors
Cleves H. Howell
Howard P. Bunger,
by
Attorney March 13, 1934.  C. H. HOWELL ET AL  1,950,848
VALVE
Filed April 17, 1933  3 Sheets-Sheet 3
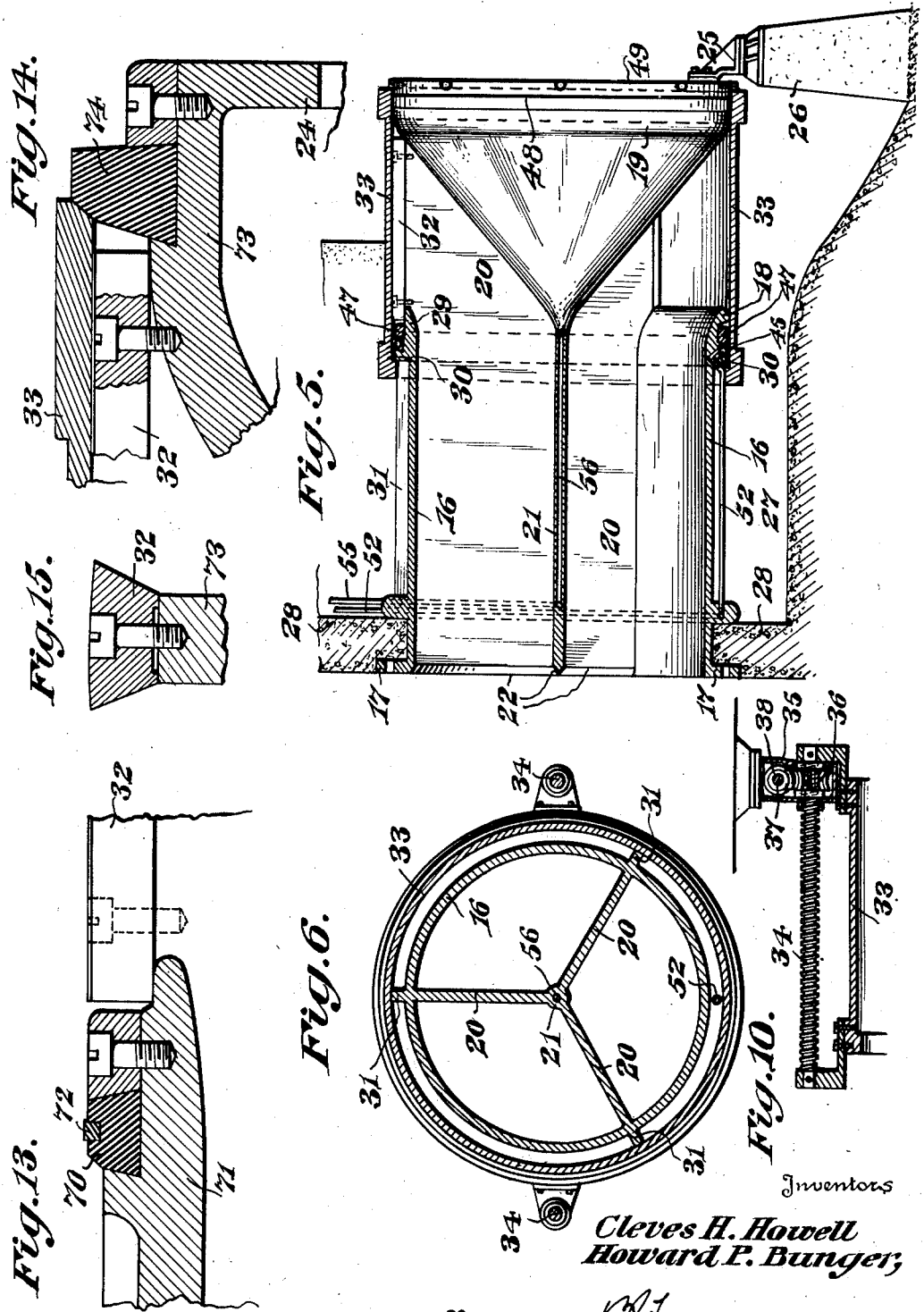
Inventors
Cleves H. Howell
Howard P. Bunger;
By
Attorney

Patented Mar. 13, 1934

1,950,848

UNITED STATES PATENT OFFICE 1,950,848

VALVE

Cleves H. Howell, Albuquerque, N. Mex., and
Howard P. Bunger, Wheat Ridge, Colo.

Application April 17, 1933, Serial No. 666,572

11 Claims. (Cl. 137—139)

This invention in its more specific aspect, relates to valves of the type employed for conduits of large diameters, such as those used in irrigation work.

One of the objects of the present invention is to provide a relatively simple, and therefore inexpensive structure in which the parts are few and readily assembled, the combination creating an effective valve for the purpose.

A further and important object is to provide packing means for the valve with controlling mechanism so combined with the valve operating devices, that the pressure of the packing on the valve can be relieved when the valve is operated, thereby insuring less wear on the packing and securing easy movement of the valve.

In the accompanying drawings:

Figure 1 is an end elevation of the preferred embodiment of the invention.

Figure 2 is a side elevation of the same, partly in section.

Figure 3 is a longitudinal sectional view showing the valve member in its open position.

Figure 4 is a cross sectional view on the line 4—4 of Figure 3.

Figure 5 is a view similar to Figure 3, but showing the plug member in elevation and the valve member in closed position.

Figure 6 is a cross sectional view on the line 6—6 of Figure 3.

Figure 7 is a detail sectional view on an enlarged scale of the rear packing member or seal.

Figure 8 is a similar view of the front packing member or seal on the plug member.

Figure 9 is a detail cross sectional view of the form of guide rib that may be employed.

Figure 10 is a detail horizontal sectional view illustrating one of the operating devices for the valve member.

Figure 11 is an enlarged detail view of a portion of the same.

Figure 12 is a detail sectional view showing the locking device for the operating wheel.

Figure 13 is a detail sectional view of a modified form of packing or seal on the conduit member.

Figure 14 is a similar view of a modified form of packing or seal for the plug member.

Figure 15 is a detail sectional view showing a form of wear plate that may be employed in connection with the guiding means for the valve member.

In the embodiment disclosed, a tubular conduit member 16 is employed that is provided at its rear end with a flange 17, by which it can be connected to the usual conduit. This member 16, in the present instance, constitutes a discharge end for the conduit, and at its outer end is provided with an outwardly flared flange 18 surrounding what may be termed the discharge mouth of the conduit member.

Spaced from this mouth is a plug member 19 in the form of a cone, which is disposed in opposition to the conduit. This plug member is joined to the conduit member by radially disposed webs 20, three being employed in the present disclosure, though the number may be varied, as desired. The conduit member 16, the plug member 19, and the webs 20 may be and preferably are cast in one unit. As will be observed these webs extend substantially from the inner end of the conduit member 16 throughout the length of the same and bridge the space between said member and the plug member. They are joined at the center in a unitary hub portion 21, and their advance edges may be tapered as indicated at 22. The inner side of the plug member 19 may be reenforced by flanges 23 extending from the apex of the member to the rear margin of the same, where they are united with an inturned annular flange 24. This flange is secured at its lower portion to a bracket 25 that is mounted on a suitable pedestal 26. The entire structure, as shown, is located within a chamber 27 formed of concrete or the like, the rear end of the conduit member 16 being shown as embedded in the inner end wall 28 of said chamber.

Behind the flange 18 of the conduit member, the cylindrical wall of said member is preferably thickened, as shown at 29, and the rear portion of the said conduit member is provided with an annular rib 30. Between this thickened portion 29 and the rib 30, the exterior of the conduit member is provided with longitudinally disposed guide ribs 31, these ribs, as will be clear by reference to Figure 6, constituting in effect extensions of the webs 20, and therefore being in line with the edge portions of the webs that extend between the conduit member 16 and the plug member. The upstanding vertical web 20 may furthermore be provided with a bronze wear strip 32. A tubular valve member 33 surrounds the conduit member 16, and has a slidable bearing on the ribs 31 and the edges of the webs 20, this valve member being movable to and from a position across the space between the conduit member and the plug member, and therefore acting as a closure for said space, its inward or opening movement being limited by the annular stop rib 30, against which it is adapted to abut.

In order to operate this valve member the following mechanism is preferably employed. Secured to opposite sides of the valve member are screws 34 that pass through stationary housings 35. In these housings are nuts 36 having threaded engagements with the screws 34, and being in the form of worm gears. Vertical shafts 37 are connected to correspondingly arranged worms 38 located in the housings 35 and in mesh with the worm gear nuts 36. The shafts 37 are geared, as illustrated at 39, to horizontal shafts 40, which in turn are geared, as shown at 41 to a vertical operating shaft 42 extending through a pedestal 43 and having a hand wheel 44 on its upper end. By turning this hand wheel, it will be evident that through the gearing described and shown, the valve member can be reciprocated between its opened and closed position.

In order to avoid leakage, packing is preferably employed on the discharge end of the conduit member 16 and on the plug member 19. In the preferred form of construction and as shown in detail in Figure 7, the first-mentioned is in the form of an expansible chambered ring 45 clamped between a pair of annular jaws 46 and 47, one of which, 47, is removable. Likewise, as illustrated in detail in Figure 8 the packing or seal for the plug member consists of a corresponding elastic chambered packing ring 48 held in place by a detachable ring 49. Means are provided for supplying and controlling the supply of fluid under pressure to these packing or sealing rings 45 and 48. Thus in the embodiment disclosed a pipe line 50 leads from any source of fluid under pressure, as for example, the reservoir holding the water that is delivered through the conduit. Or a pump (not shown) may be employed for furnishing such fluid. The pipe 50 is tapped at 51 by a branch pipe 52 which leads to the rear seal 45. In the pipe 50 behind the connection 51 is a valve 53. This valve is connected to an operating lever 54. At the rear of the valve 53, another branch pipe 55 leads from the pipe 50 and extends to the other or plug packing ring 48. It will be understood that any suitable connections may be employed for the purpose. Thus in the present embodiment the pipe 55 has as a part of its passageway, a bore 56 in the hub 21 of the webs 20. Beyond the connection of the branch pipe 55, a second controlling valve 57 is located in the pipe 50 and from this valve 57 the pipe is open to freely discharge the stream flowing therethrough.

Now referring to Figures 1 and 2, it will be noted that mounted on one side of the pedestal 43 is a flanged disk 58 which may be employed as an indicator, the same being geared as indicated at 59 to the main operating shaft 42. The valve 57 is actuated by a hand lever 60, and this hand lever is adapted to engage in a notch 61 formed in the periphery of the disk 58. There is also provided a lock or latch for holding the hand wheel 44 against rotation. This, as illustrated in Figure 12, is in the form of a vertically sliding bolt 62, the upper end of which engages in a notch 63 in the hand wheel. The bolt is urged upwardly by a spring 64 and is adapted to be moved downwardly by a wedge 65 that engages over a head 66 on the lower end of the bolt. The wedge has a link connection 67 with the operating lever 60. The hand lever 54 for the first valve 53 is also preferably provided with a holding hook 68 that is adapted to engage behind the flange of the disk 58 (see Figure 2), the hook being movable downwardly so as to pass the flange and being operated by a push rod 69 for that purpose.

The operation of the structure may be described as follows. When the hand wheel 44 is rotated in one direction, through the shafting and gearing above described, it will be evident that with the valve member 33 in its open position, it will move across the space between the conduit member 16 and the plug member 19, and by closing said space, cut off the flow of water or other fluid therethrough. When in its operative or closed position, if the hand wheel is moved in the opposite direction, the valve will be moved rearwardly or to its open position. The operation of the valve is however made dependent on the condition of the packing or sealing rings, and these rings are made active or inactive in the following way. When the two valves 53 and 57 are opened, water or other fluid in the conduit 50 can flow freely therethrough and discharge therefrom so that there is no substantial pressure on the packing rings 45 and 48. If, however, the valve 53 is closed, which can be readily accomplished by disengaging the hook 68 from the flange of the disk 58, then pressure is built up in the pipe 50 and will extend through the branch pipe 52, thereby creating pressure in the packing ring 45 and causing the same to be expanded outwardly against the interior of the valve member 33. If the valve 53 is opened and the valve 57 is closed, then it will be evident that pressure will be created through both branch pipes 53 and 55 and both rings 45 and 48 will be expanded. When, however, the valve is to be actuated, it is desirable that no pressure be upon the packing rings. Under those circumstances both valves 53 and 57 are opened. By referring now to Figure 1, it will be observed that when the valve 57 is closed, and pressure is being exerted on both packing rings, the lever 60 being engaged in the notch 61 of the disk 58, and the wedge 65 being in the position shown in Figures 1 and 12, the hand wheel 44 will be locked against rotation. Hence the valve is locked against movement. When, however, the valve 57 is opened and pressure is released on both packing rings, then the hand lever 60 is disengaged from the notch 61 and at the same time the locking bolt 62 is depressed by the wedge 65, so that the hand wheel 44 is free to rotate and the valve can be moved. By thus releasing pressure upon the packing rings, it will be obvious that the valve is more easily operated and wear upon these rings is greatly reduced.

Instead of expansible packing rings, fixed packing members may be employed if desired. Thus in Figure 13 a bronze packing ring 70 may be provided on the conduit member 71 with a suitable packing ring 72 carried thereby. For the plug member 73 a suitable bronze abutment packing ring 74 may be utilized.

From the foregoing, it is thought that the construction, operation and many advantages of the herein described invention will be apparent to those skilled in the art without further description, and it will be understood that various changes in the size, shape, proportion, and minor details of construction may be resorted to without departing from the spirit or sacrificing any of the advantages of the invention.

What we claim is:—

1. A valve for hydraulic and like conduits comprising a conduit member having a mouth, a plug member spaced from the conduit mouth, spaced longitudinal guide ribs on the exterior of the conduit, and a tubular valve member surrounding and longitudinally movable on the conduit member to and from a position across the space between the same and the plug member, said valve having a slidable mounting on the spaced ribs.

2. A valve for hydraulic and like conduits comprising a conduit member having a mouth, a plug member spaced from the conduit mouth, a transversely disposed stop on the rear portion of the conduit member, a valve packing surrounding the conduit member adjacent the mouth, spaced longitudinal guide ribs on the conduit between the stop and packing, and a tubular valve member surrounding and longitudinally movable on the conduit member to and from a position across the space between the same and the plug member, said valve having a slidable mounting on the spaced ribs and having its rearward movement limited by the stop.

3. A valve for hydraulic and like conduits comprising a conduit member having a mouth, an annular packing holding rib adjacent the mouth and an annular stop ring remote from the mouth, a plug member spaced from the mouth, internal webs in the conduit member extending across the space between the conduit and plug members and uniting the same, said conduit member between the annular ribs having longitudinal guide ribs, and the outer portions of the webs between the conduit member and the plug member forming guides, and a tubular valve member slidable on the guide ribs and webs between a closed position across the space between the conduit member and the plug member and an open position determined by the annular stop rib.

4. A valve for hydraulic and like conduits, comprising a conduit member, a plug member spaced therefrom, and a main valve member movable to and from a position across the space between said members, a fluid pressure operated packing for the valve member, mechanism for moving the valve member, and common means for controlling the supply of fluid pressure to the packing and controlling the operation of the valve.

5. A valve for hydraulic and like conduits, comprising a conduit member, a plug member spaced therefrom, and a main valve member movable to and from a position across the space between said members, a fluid pressure operated packing for the valve member, means for supplying fluid under pressure to the packing, a valve controlling the fluid supply, actuating means for the supply controlling valve, mechanism for moving the main valve member, and means for holding the said moving mechanism against movement to operate the main valve member, said latter means being operable by the operating means for the supply controlling valve.

6. A valve for hydraulic and like conduits, comprising a conduit member, a plug member spaced therefrom, and a main valve member movable to and from a position across the space between said members, a fluid pressure operated packing for the valve member, means for supplying fluid under pressure to the packing, a valve controlling the fluid supply, actuating means for the supply controlling valve, mechanism for moving the main valve member, a lock for holding the said moving mechanism against movement to operate the main valve member, and means for causing the operating means for the main valve member to be unlocked when the supply controlling valve is moved to a position to release the pressure on the packing.

7. A valve for hydraulic and like conduits, comprising a conduit member, a plug member spaced therefrom, and a main valve member movable to and from a position across the space between said members, a fluid pressure operated packing for the valve member on the conduit member, a fluid pressure operated packing for the valve member on the plug member, means for controlling the supply of fluid under pressure to both packings, and means for holding the main valve member against movement until the fluid pressure on the packings is released.

8. A valve for hydraulic and like conduits, comprising a conduit member, a plug member spaced therefrom, and a main valve member movable to and from a position across the space between said members, a fluid pressure operated packing for the valve member on the conduit member, a fluid pressure operated packing for the valve member on the plug member, a valve for controlling the supply of fluid pressure to both packings, actuating means for the controlling valve, actuating means for the main valve member, and a lock for the last actuating means operable by the first actuating means.

9. A valve for hydraulic and like conduits comprising a conduit member, a plug member spaced therefrom, and a main valve member movable to and from a position across the space between said members, means for moving the main valve member, a fluid operated packing for the main valve member, a conduit for supplying fluid under pressure to the packing and having a discharge for relieving said pressure, and a valve controlling the discharge.

10. A valve for hydraulic and like conduits, comprising a conduit member, a plug member spaced therefrom, and a main valve member movable to and from a position across the space between said members, gearing for moving the main valve member including a rotary actuating device, a lock for holding the device against rotation, a fluid operated packing for the main valve member, a conduit for supplying fluid under pressure to the packing and having a discharge for relieving said pressure, a valve controlling the discharge, and common operating means for the valve and lock.

11. A valve for hydraulic and like conduits, comprising a conduit member, a plug member spaced therefrom, and a main valve member movable to and from a position across the space between said members, gearing for moving the main valve member including a rotary actuating device, a lock for holding the device against rotation, fluid operated packing for the main valve member located on the conduit member, fluid operated packing for the main valve member located on the plug member, a supply conduit connected to both packings and having a discharge for relieving pressure therefrom, a valve controlling the discharge, an operating device for the controlling valve, and a connection between the operating device and the lock for the rotary actuating device that causes the same to free the said rotary actuating device when the controlling valve is opened and the pressure on the packings is relieved.

CLEVES H. HOWELL.
HOWARD P. BUNGER.